(12) United States Patent
Liu

(10) Patent No.: US 7,623,796 B2
(45) Date of Patent: Nov. 24, 2009

(54) DATA-AIDED MULTI-SYMBOL PHASE ESTIMATION FOR OPTICAL DIFFERENTIAL MULTILEVEL PHASE-SHIFT KEYING SIGNALS

(75) Inventor: Xiang Liu, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 606 days.

(21) Appl. No.: 11/307,899

(22) Filed: Feb. 27, 2006

(65) Prior Publication Data

US 2007/0201879 A1    Aug. 30, 2007

(51) Int. Cl.
*H04B 10/06*    (2006.01)

(52) U.S. Cl. .................. 398/202; 398/188; 398/183; 398/208; 398/209

(58) Field of Classification Search ............... 398/202, 398/208, 209, 210, 211, 212, 213, 214, 183, 398/188, 141, 158, 159, 154, 161, 155, 203
See application file for complete search history.

(56) References Cited

U.S. PATENT DOCUMENTS

| | | | | |
|---|---|---|---|---|
| 7,444,085 | B2 * | 10/2008 | Ikeuchi et al. ............. | 398/202 |
| 2002/0012152 | A1 * | 1/2002 | Agazzi et al. ............. | 359/189 |
| 2003/0198478 | A1 * | 10/2003 | Vrazel et al. ............. | 398/183 |
| 2004/0081470 | A1 * | 4/2004 | Griffin ..................... | 398/188 |
| 2004/0218932 | A1 | 11/2004 | Epworth et al. | |
| 2008/0075472 | A1 * | 3/2008 | Liu et al. ................. | 398/202 |
| 2009/0086215 | A1 * | 4/2009 | Liu et al. ................. | 356/491 |

OTHER PUBLICATIONS

R. A. Griffin, "Integrated DQPSK Transmitters," Optical Society of America, 2005, pp. 1-3.
C. Kim et al., "Direct-detection optical differential 8-level phase-shift keying (OD8PSK) for spectrally efficient transmission," Optics Express, vol. 12, No. 15, Jul. 26, 2004.
D. Divsalar, et al., "Multiple-symbol differential detection of MPSK," IEEE Trans. Commun., vol. COM-38, No. 3, Mar. 1990, pp. 300-308.
H. Leib, "Data-Aided Noncoherent Demodulation of DPSK," IEEE Trans. on Comm., vol. 43, No. 2, Feb.-Apr. 1995, pp. 722-725.
Y. Yadin et al., "Soft detection of multichip DPSK over the nonlinear fiber-optic channel," IEEE Photon. Technol. Lett., vol. 17, No. 9, Sep. 2005, pp. 2001-2003.
S. Calabro et al., "Improved Detection of Differential Phase Shift Keying through Multi-Symbol Phase Estimation", 2004.

(Continued)

*Primary Examiner*—Hanh Phan
(74) *Attorney, Agent, or Firm*—Brosemer, Kolefas & Assoc., LLC

(57) ABSTRACT

A data-aided, multi-symbol phase estimation (MSPE) scheme is described for improving receiver sensitivity in the direct-detection of optical differential multi-level phase-shift keying (ODmPSK) signals including optical differential quadrature phase-shift keying (ODQPSK) signals, ODQPSK signals with amplitude shift keying (ODQPSK+ASK), optical differential 8-level phase-shift keying (OD8PSK) signals with eight phase levels, and optical differential phase-shift keying signals with more than eight phase levels. The use of data-aided MSPE substantially reduces the "differential detection penalty," with receiver sensitivity approaching that of coherent detection schemes.

32 Claims, 10 Drawing Sheets

OTHER PUBLICATIONS

M. Nazarathy et al., "Multichip differential phase encoded optical transmission," IEEE Photon. Technol. Lett., vol. 17, No. 5, May 2005, pp. 1133-1135.

S. Hayase et al., "Chromatic dispersion and SPM tolerance of 8-state/symbol (binary ASK and QPSK) modulated signal," OSA 2004, ThM3.

* cited by examiner

DATA-AIDED MULTI-SYMBOL PHASE ESTIMATION FOR OPTICAL DIFFERENTIAL MULTILEVEL PHASE-SHIFT KEYING SIGNALS

FIELD OF THE INVENTION

The present invention relates to the field of high-speed optical communications, and more specifically to methods and apparatus of data-aided, multi-symbol phase estimation for enhancing the sensitivity of reception of differential multilevel phase-shift keying signals.

BACKGROUND INFORMATION

Optical differential quadrature phase-shift keying (ODQPSK) is an attractive modulation format for high-speed optical communications because it offers high spectral efficiency and high tolerance to chromatic dispersion and polarization-mode dispersion (PMD). An ODQPSK signal is conventionally received by a direct-detection receiver consisting of two optical delay interferometers (ODIs) for demodulation followed by two balanced detectors. While the sensitivity of a direct-detection ODQPSK receiver is better than that of a conventional on-off-keying (OOK) receiver, it is worse than that of a quadrature phase-shift keying (QPSK) receiver with coherent detection. Direct-detection ODQPSK receivers, however, are usually simpler than coherent QPSK receivers.

Optical differential 8-level phase-shift keying (OD8PSK) is another attractive modulation format that offers high spectral efficiency and high tolerance to chromatic dispersion and PMD. The receiver sensitivity of OD8PSK, however, is much worse than that of ODQPSK and optical differential binary phase-shift keying (ODBPSK) for the same data rate. This is because the minimum symbol spacing in the symbol constellation of OD8PSK is much smaller than those of ODBPSK and ODQPK, and the performance of OD8PSK based on differential detection is severely limited by differential phase noise.

There are two common methods that have been used in wireless communications to reduce the performance penalty associated with differential detection: multiple-symbol differential detection (MSDD), and data-aided multi-symbol phase estimation (MSPE). Both the MSDD and MSPE approaches have been extended to optical differential binary phase-shift keying (ODBPSK). For ODQPSK, however, an MSDD receiver would require at least four optical delay interferometers (ODIs) and four balanced detectors, which makes the receiver more complex and potentially expensive. The complexity of an MSDD receiver would be further increased for OD8PSK and optical differential multilevel phase-shift keying signals (ODmPSK) with m>8.

SUMMARY OF THE INVENTION

The present invention is directed to a data-aided multi-symbol phase estimation (MSPE) scheme for the direct-detection of ODmPSK signals, including ODQPSK and OD8PSK signals. The MSPE scheme of the present invention can be extended to the detection of signals with simultaneous ODmPSK and amplitude-shift keying (ASK) modulations, such as ODQPSK+ASK signals. The MSPE scheme of the present invention can be implemented with the same optical hardware as that which is conventionally used for direction detection of ODQPSK, yet with a substantial reduction in the differential detection penalty so that performance approaching that of more complex coherent detection schemes is attained, and with the capability of detecting more spectrally efficient ODmPSK signals with m>4.

An exemplary direct detection receiver for ODQPSK signals includes a MSPE circuit which utilizes previously recovered data symbols to recursively extract the phase reference. A further exemplary embodiment of a receiver for ODQPSK+ASK signals uses the information regarding the detected signal intensity in the MSPE process.

In yet further embodiments, receivers for ODmPSK for m=8 and m>8 are also disclosed. For ODmPSK, the decision variables for the first two data tributaries are directly decoded by the two ODIs of the optical circuit. The two decision variables are improved by using the MSPE scheme. A soft-detection and decoding circuit is used to extract the additional data tributaries based on the improved first two decision variables. Appropriate data pre-coding, which is dependent on the optical modulation scheme and receiver decoding scheme, is then used to ensure the correct recovery of all the original data tributaries.

DETAILED DESCRIPTION

Figure 1:
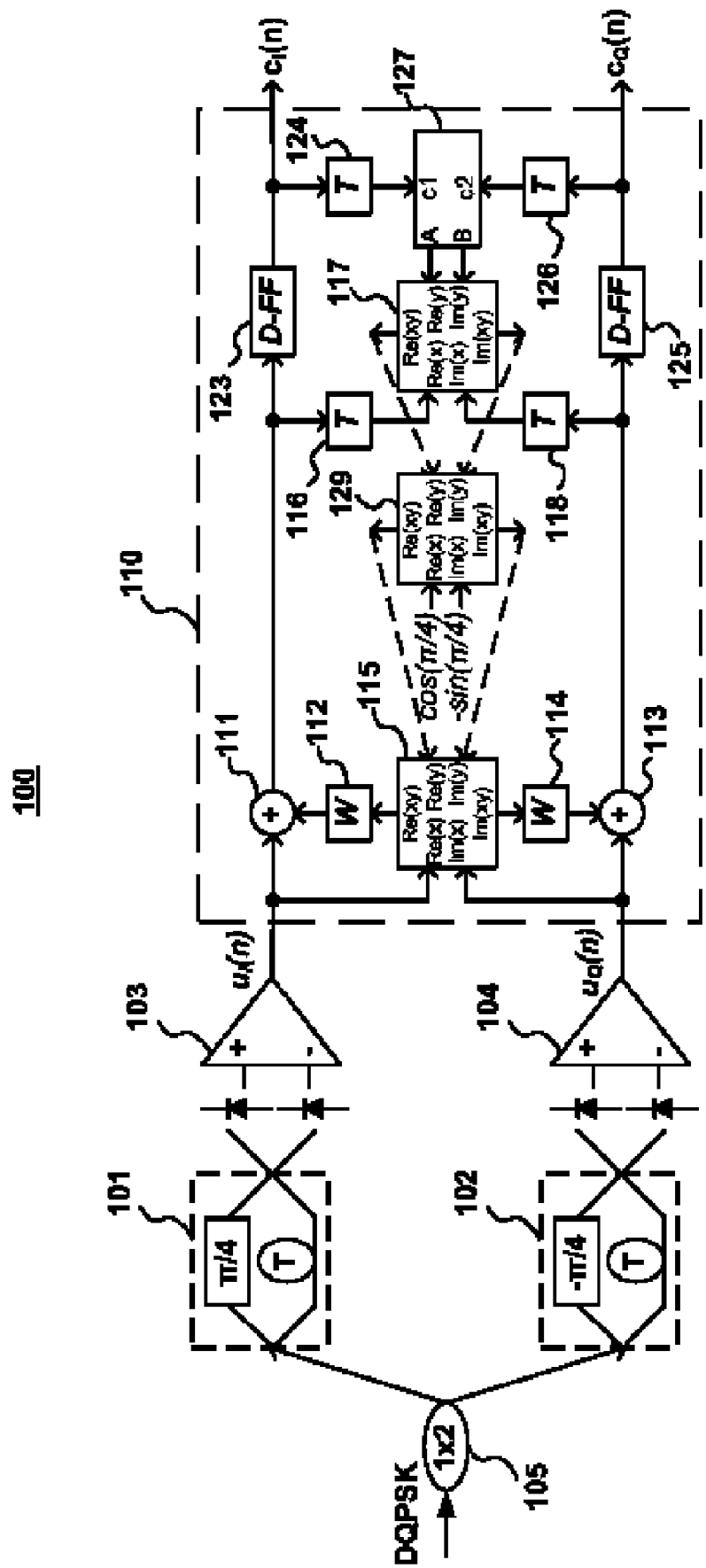
FIG. 1 is a schematic representation of an exemplary embodiment of an ODQPSK direct-detection receiver having a recursive data-aided MSPE circuit in accordance with the present invention.

FIG. 1 schematically depicts an exemplary embodiment of an optical differential quadrature phase-shift keying (ODQPSK) direct-detection receiver 100 with a recursive data-aided multi-symbol phase estimation (MSPE) circuit 110 in accordance with the present invention. The optical portion of the receiver 100 is conventional and includes two optical delay interferometers (ODIs) 101 and 102, with the appropriate phase offsets ($\pi/4$ and $-\pi/4$ for DQPSK), coupled to respective balanced detectors 103 and 104. An input ODQPSK signal is coupled by a 1×2 coupler 102 to the inputs of the ODI's 101 and 102. The balanced detectors 103 and 104 generate in-phase (I) and quadrature (Q) decision variables $u_I(n)$ and $u_Q(n)$ as follows:

$$u_I(n)=Re[e^{j\pi/4}y(n)y(n-1)^*], \quad u_Q(n)=Im[e^{j\pi/4}y(n)y(n-1)^*], \tag{1}$$

where $y(n)$ is the optical field of the n-th symbol before demodulation, and "*" represents the complex conjugate of the respective variable.

The data-aided MSPE circuit 110 utilizes the previously recovered data symbols to recursively extract a more accurate phase reference $z(n-1)$ as follows:

$$z(n-1)=y(n-1)+wz(n-2)\exp[j\Delta\phi(n-1)], \tag{2}$$

where $\Delta\phi(n-1)=\phi(n-1)-\phi(n-2)\in\{0, 0.5\pi, \pi, 1.5\pi\}$, is the difference between the optical phase of the (n−1)-th symbol, $\phi(n-1)$, and the (n−2)-th symbol, $\phi(n-2)$. The last term of Eq. 2 can be obtained from the recovered I and Q data tributaries, $c_I(n)$ and $c_Q(n)$ as follows:

$$\exp[-j\cdot\Delta\phi(n)] = \tag{3}$$
$$NOT\{XOR[c_I(n), c_Q(n)]\}\cdot(-1)^{\overline{c_I(n)}} + j\cdot XOR[c_I(n), c_Q(n)]\cdot(-1)^{\overline{c_I(n)}}$$

Table I shows the relation between the differential phase $\Delta\phi(n)$ and the recovered data tributary values.

TABLE I

| $\Delta\phi(n)$ | 0 | $\pi/2$ | $\pi$ | $1.5\pi$ |
|---|---|---|---|---|
| $\exp[-j\Delta\phi(n)]$ | 1 | −j | −1 | j |
| $c_I(n)$ | 1 | 0 | 0 | 1 |
| $c_Q(n)$ | 1 | 1 | 0 | 0 |

Using Eqs. 1-3, two improved decision variables $x_I$ and $x_Q$ can be derived as follows:

$$x_I(n)=Re[x(n)], x_Q(n)=Im[x(n)], \text{ and}$$

$$x(n)\approx u(n)+w\cdot u(n)\cdot x(n-1)\cdot\exp(-j\Delta\phi(n-1))\cdot\exp(-j\pi/4), \tag{4}$$

where w is a weighting factor or a "forgetting" factor, and $u(n)=u_I(n)+ju_Q(n)$. Eq. 4 was derived using the following approximation: $1/y(n-1)=y(n-1)^*$. This approximation is valid when the receiver performance is phase-noise limited, which is applicable to ODQPSK.

The data-aided MSPE circuit 110 is implemented in accordance with Eqs. 3 and 4. The circuit 110 includes adders 111 and 113, weighting blocks 112 and 114, complex multiplier blocks 115, 117 and 129, delay elements 116, 118, 124 and 126, threshold elements (D-FF) 123 and 125, and a logic operation block 127. The various analog functions in the MSPE circuit 110 can be realized by using high-speed mixed signal circuits, such as those based on SiGe bipolar technology, for example.

In the exemplary embodiment shown in FIG. 1, the logic operation block 127 implements the following functions: $A=NOT(XOR(c1, c2))(-1)^{not(c1)}$ and $B=XOR(c1, c2)(-1)^{not(c1)}$, thereby digitally realizing the operations described in Eq. 3. To perform the computations described in Eq. 4, three complex four-quadrant multipliers 115, 117, 129 are used. Each of the complex multipliers 115, 117, 129 has an input for the real and imaginary components of two complex inputs (x and y), and generates the real and imaginary components of their complex product (xy). The outputs A and B from the logic block 127 are applied as the real and imaginary components of the y input of the multiplier 117.

Delay elements 116, 118, 124 and 126 provide a delay T which is inversely proportional to the signal symbol rate, which is half of the bit rate for DQPSK. Delay elements 116 and 118 delay the outputs of the adders 111 and 113 before being applied as the real and imaginary components of the x input of the multiplier 117, while the delay elements 124 and 126 delay the recovered data tributaries $c_I(n)$ and $c_Q(n)$ before being applied to the logic block 127.

The real and imaginary components of the product generated by the multiplier 117 are applied as the real and imaginary components of the y input of the multiplier 129 which is multiplied by the constants $\cos(\pi/4)$ and $-\sin(\pi/4)$ as the real and imaginary components of the x input of the multiplier 129. The weighting blocks 112, 114 multiply the real and imaginary components of the product generated by the multiplier 115 by the forgetting factor w and the weighted results are added by the adders 111, 113 to the in-phase and quadrature decision variables $u_I(n)$ and $u_Q(n)$, respectively. Each of the outputs of the adders 111 and 113 are then compared against a threshold value $V_{th}$ by the threshold elements or decision flip-flops (D-FFs) 123 and 125, respectively, each of which generates a logic high output when its input exceeds the threshold value $V_{th}$. Here, the threshold value $V_{th}$ is nominally zero because of the use of balanced detectors. The outputs of the threshold elements are the recovered in-phase and quadrature data tributaries, $c_I(n)$ and $c_Q(n)$.

As can be appreciated by those skilled in the art, the circuit 110 can be implemented in a variety of ways, including analog and digital hardware as well as software implementations.

Tests verify the sensitivity improvements of the data-aided MSPE approach of the present invention. Monte-Carlo simulations are performed to obtain bit-error-rates (BER) at different optical signal-to-noise ratio (OSNR) values. Such simulations have been performed assuming a 20-Gb/s DQPSK signal with a pseudo-random bit stream (PRBS) of length $2^7-1$. The transmitter was assumed to be ideal and the receiver to have a $3^{rd}$-order Gaussian optical filter with a 3-dB bandwidth of 12.5 GHz and a Gaussian electrical filter with a 3-dB bandwidth of 8 GHz after each balanced detector. The electrical filter is not shown in the figures for simplicity. In addition, the limited bandwidth of the balanced detector can also serve the electrical filtering function so the specific electrical filter may not be needed. The OSNR is defined as the signal power over the noise power of two polarization states within a 0.1-nm bandwidth. For simplicity, only the noise component that has the same polarization as the signal was considered in the demodulation process.

Figure 2:
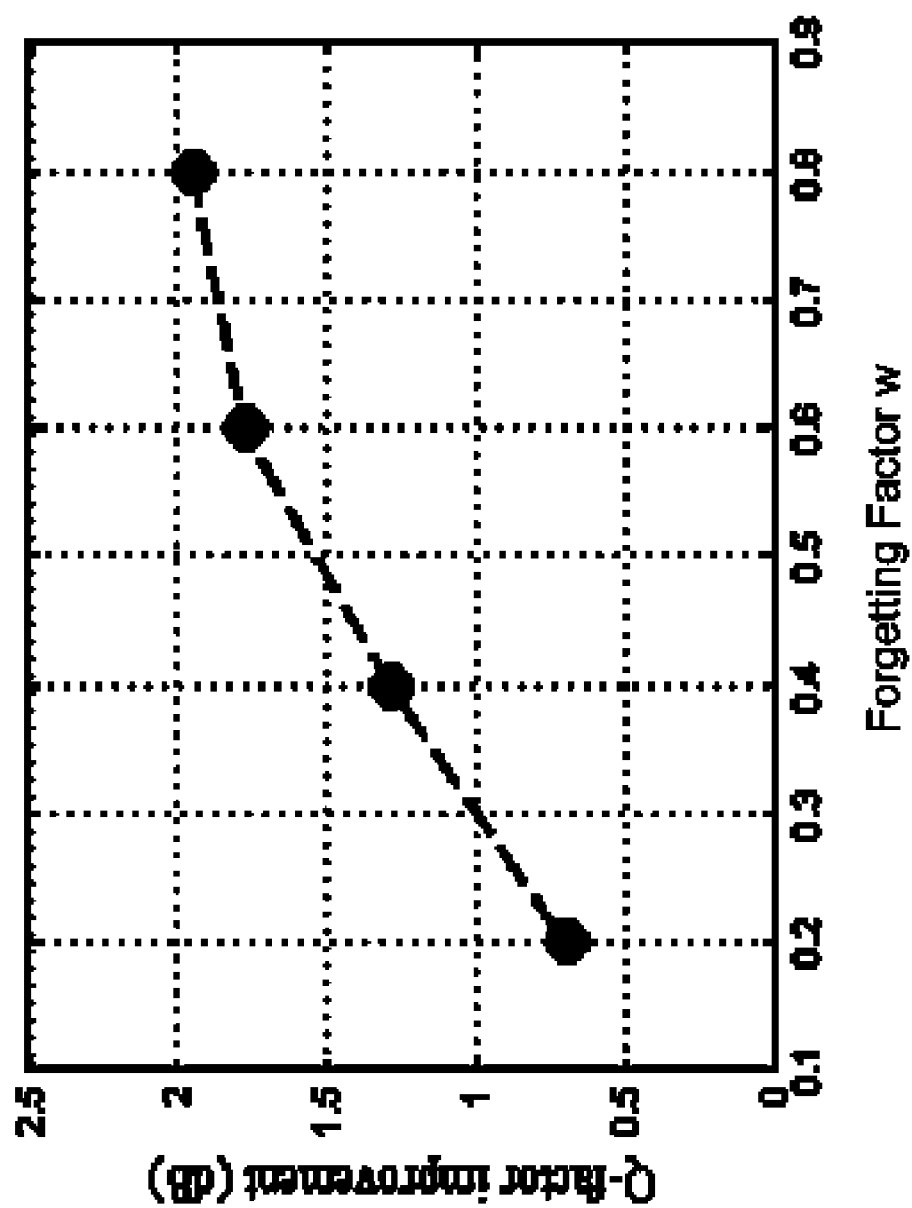
FIG. 2 is a graph showing an improvement of 10 dB in Q-factor attributable to the data-aided MSPE circuit of FIG. 1 as a function of the forgetting factor w, at a received optical signal-to-noise ratio (OSNR), defined as the ratio between the signal power and the noise power in two polarization states within an optical spectrum bandwidth of 0.1 nm.

FIG. 2 shows the improvement in the Q-factor over a conventional ODQPSK receiver by the data-aided MSPE ODQPSK receiver 100 of the present invention as a function of the forgetting factor w, at a received OSNR of 10 dB. As expected, the improvement increases as w increases.

Figure 3:
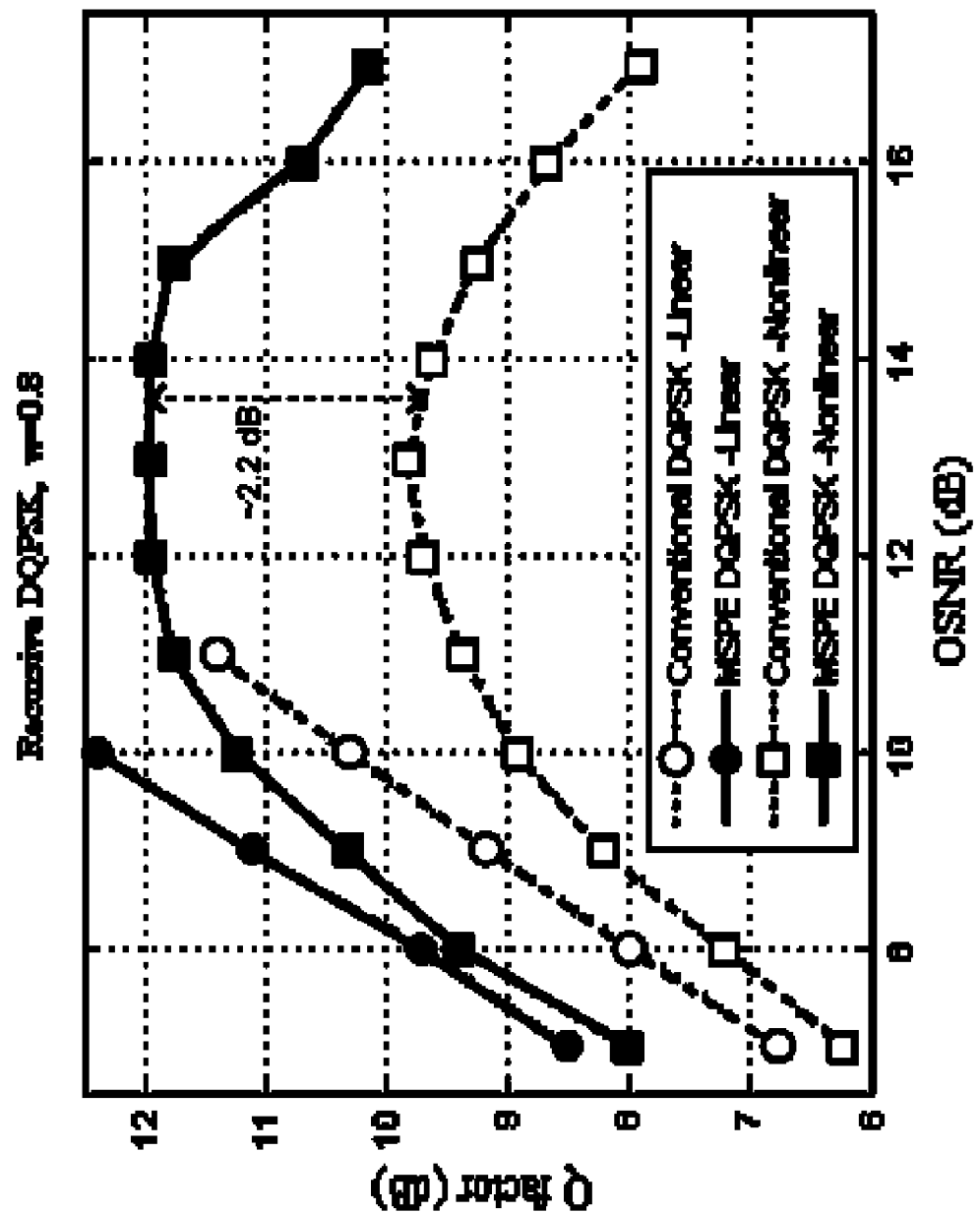
FIG. 3 is a graph showing the Q-factor as a function of OSNR with a forgetting factor w of 0.8, for the ODQPSK receiver of FIG. 1 and for a conventional ODQPSK receiver.

FIG. 3 shows the Q-factor (derived directly from the BER) as a function of OSNR (defined with a noise bandwidth of 0.1 nm) with w=0.8 for the receiver 100 of the present invention and for a conventional receiver. In the linear regime, the data-aided MSPE receiver 100 outperforms the conventional receiver by approximately 1.8 dB at a BER of approximately $10^{-4}$. In the nonlinear regime, the simulation takes into account Gordon-Mollenauer nonlinear phase noise caused by the interaction of amplified spontaneous emission (ASE) noise and self phase modulation (SPM). The simulation assumes that the ASE noise is distributively added in a transmission link having eight amplified optical spans. The mean nonlinear phase shift increases with the signal power or the received OSNR, and is about 1 radian when the received OSNR is 13 dB. The optimal performance is reached when the mean nonlinear phase shift is about 1 radian. As shown in FIG. 3, the MSPE provides a higher tolerance to the SPM and the Q-factor improvement in the regime of moderate SPM is approximately 2.2 dB.

The data-aided MSPE receiver of the present invention can be extended to differential quadrature phase shift keying with amplitude shift keying (DQPSK+ASK) signals. In an exemplary embodiment, the ASK data content is removed from the DQPSK decision variables, $u_I(n)$ and $u_Q(n)$, in the MSPE process. This can be done by using a "normalizing signal" whose amplitude is proportional to the inverse of the normalized measured intensity of the (n−1)-th symbol, or I(n−1), in the MSPE process. The improved decision variables $x_I$ and $x_Q$ can be derived as follows:

$$x_I(n) = \mathrm{Re}[x(n)], \quad (5)$$

$$x_Q(n) = \mathrm{Im}[x(n)].$$

and $$x(n) \approx$$

$$u(n) + w \cdot \frac{1}{I(n-1)} \cdot u(n) \cdot x(n-1) \cdot \exp(-j\Delta\phi(n-1)) \cdot \exp(-j\pi/4).$$

Figure 4:
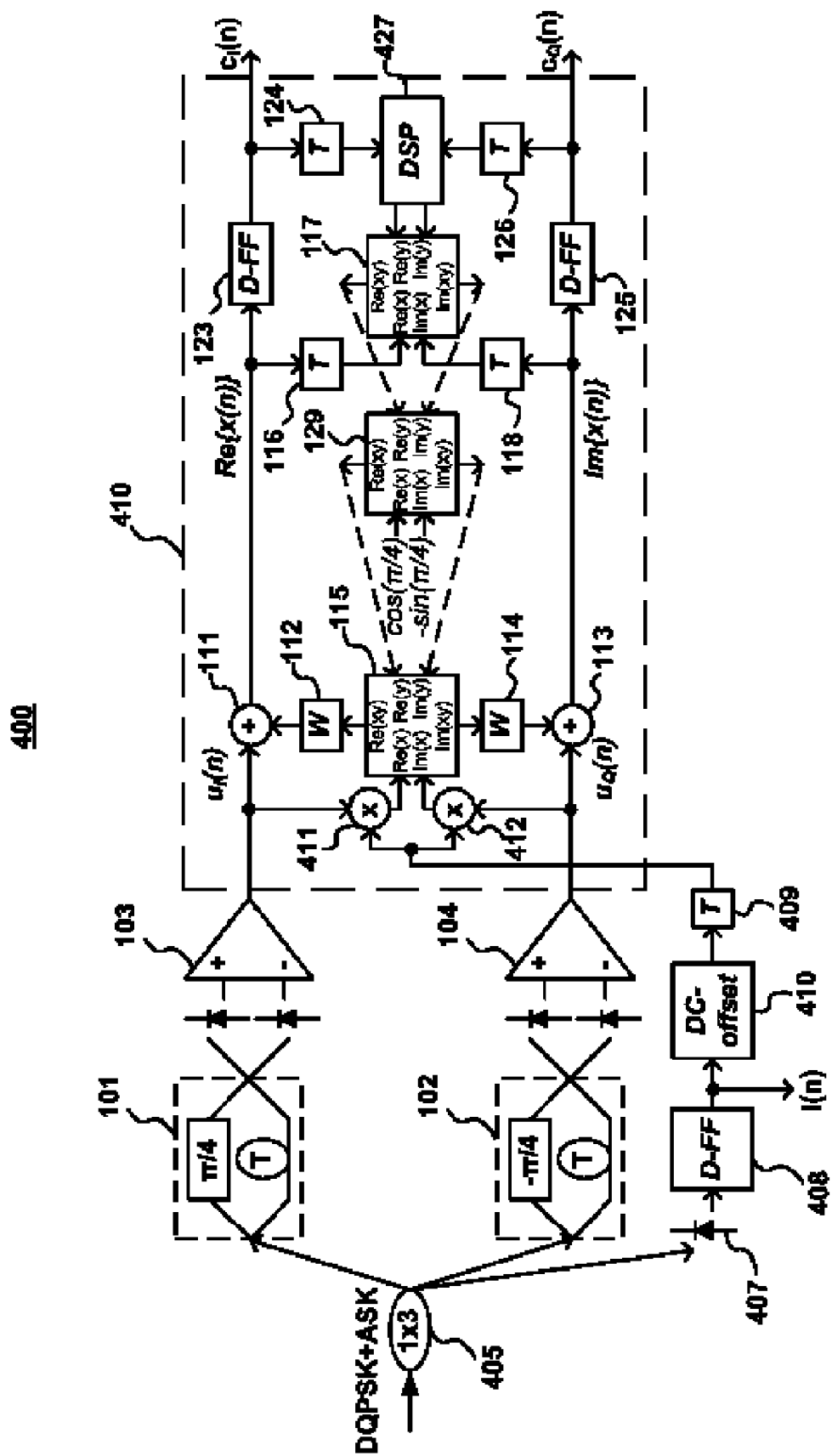
FIG. 4 is a schematic representation of an exemplary embodiment of an ODQPSK+ASK direct-detection MPSE receiver in accordance with the present invention.

FIG. 4 illustrates a further exemplary embodiment of a DQPSK+ASK receiver 400 in accordance with the present invention. In the receiver 400, a 1×3 coupler 405 splits off a third branch of the incoming optical DQPSK+ASK signal to an opto-electric converter 407. The electrical signal from the converter 407 is processed by a threshold element 408 which recovers the ASK data-tributary signal I(n). A DC-offset block 410 inverts I(n) and applies a DC-offset. The output of the DC-offset block 410 is delayed by a delay block 409 that introduces a time delay of T. The resultant signal generated by the delay block 409 is a−I(n−1), or a for I(n−1)=0 and (a−1) for I(n−1)=1, with the resultant levels having a ratio of approximately a:(a−1). This ratio is preferably set as the nominal intensity ratio between the high-power and low-power symbols in the DQPSK+ASK format. The signal output by the delay block 409 is used as the aforementioned normalizing signal and multiplies the ODQPSK decision variables via multipliers 411 and 412. The decision variables $u_I(n)$ and $u_Q(n)$ are processed by the MPSE circuit 410 to recover the in-phase and quadrature data tributaries $c_I(n)$ and $c_Q(n)$. The MSPE circuit 410 includes a DSP block 427 which performs the same logic operation described above with respect to logic block 127.

The data-aided MSPE receiver of the present invention can be further extended to ODQPSK with 4-level-ASK signals (ODQPSK+4-ASK). In such an embodiment, the DC-offset block 410 is replaced by a device, such as a simple digital-to-analog converter (DAC), that produces a normalizing signal whose amplitude is inversely linked to the signal intensity (that has four levels).

In optical fiber transmission, the self-phase modulation (SPM) effect due to fiber nonlinearity causes different nonlinear phase shifts for symbols with different ASK modulation levels. It is desired to compensate for the nonlinear phase shifts to improve the transmission performance. This can be achieved by replacing, in Eq. 5, u(n) with:

$$v(n)=u(n)\exp\{-jc_{NL}[I(n)-I(n-1)]\}, \quad (6)$$

where $c_{NL}$ is a coefficient related to the nominal nonlinear phase shift experienced by the signal over fiber transmission. This nonlinear phase shift compensation can be implemented in the MSPE circuit with another complex multiplier and additional signal processing on the recovered ASK data.

Figure 5:
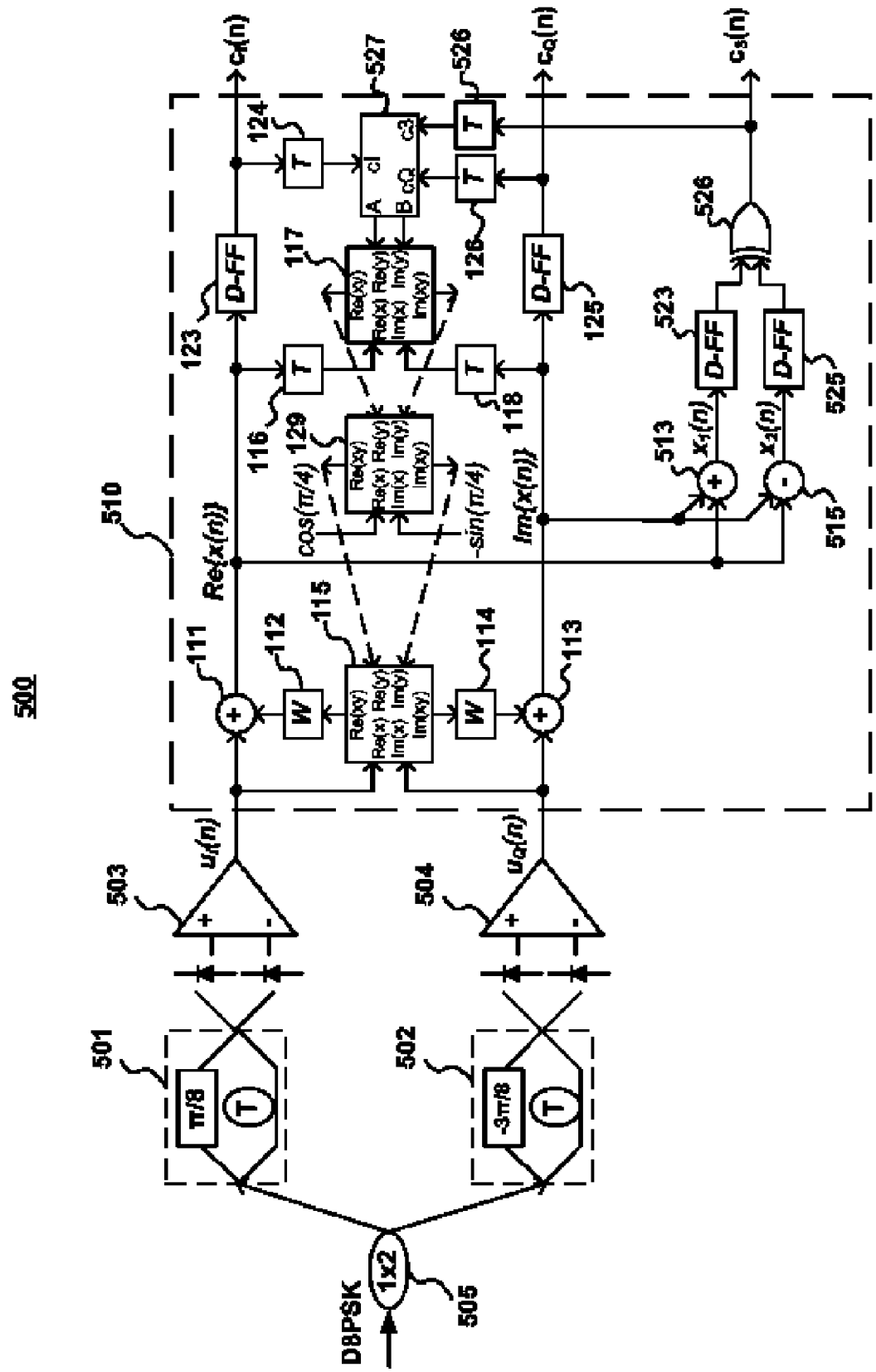
FIG. 5 is a schematic representation of an exemplary embodiment of an OD8PSK direct-detection MPSE receiver in accordance with the present invention.

In accordance with a further aspect of the present invention, the data-aided MSPE receiver of the present invention can be extended to optical differential 8-level phase-shift keying (OD8PSK). FIG. 5 shows an exemplary embodiment of a data-aided MSPE receiver 500 for OD8PSK.

As can be seen in FIG. 5, the optical components 501-505 for the OD8PSK receiver 500 are the same as that for the ODQPSK receiver 100 shown in FIG. 1, with the phase offsets of the ODIs 501, 502 being π/8 and −3π/8, respectively, (as compared to π/4 and −π/4 for DQPSK).

Three improved decision variables for the three OD8PSK data tributaries of the n-th symbol can be derived as follows:

$$D1=\mathrm{Re}[x(n)], \quad (7a)$$

$$D2=\mathrm{Im}[x(n)], \text{ and} \quad (7b)$$

$$D3=\mathrm{xor}\{\mathrm{Re}[x(n)]+\mathrm{Im}[x(n)]>0,\mathrm{Im}[x(n)]-\mathrm{Re}[x(n)]>0\}, \quad (7c)$$

where:

$$x(n)=u(n)+wu(n)x(n-1)\exp(-j\Delta\phi(n-1))\exp(-j\pi/8) \quad (7d)$$

$\Delta\phi(n-1)=\phi(n-1)-\phi(n-2)\in\{[0:7]\pi/8\}$ represents the original optical phase difference between the (n−1)-th symbol and the (n−2)-th symbol.

$\exp(-j\Delta\phi(n))$ can further be expressed as follows:

$$\exp(-j\Delta\phi(n))=A+jB, \quad (8a)$$

$$A=\mathrm{not}(\mathrm{xor}(D1,\mathrm{xor}(D2,D3)))*(-1)\char`^(\mathrm{not}(D1))/\mathrm{sqrt}(2)+ \\ \mathrm{and}(\mathrm{xor}(D1,\mathrm{xor}(D2,D3)),\mathrm{not}(\mathrm{xor}(D1,D2)))*(-1)\char`^ \\ (\mathrm{not}(D1)); \quad (8b)$$

$$B=\mathrm{not}(\mathrm{xor}(D1,\mathrm{xor}(D2,D3)))*(-1)\char`^D2/\mathrm{sqrt}(2)+\mathrm{and}(\mathrm{xor} \\ (D1,\mathrm{xor}(D2,D3)),\mathrm{xor}(D1,D2))*(-1)\char`^D2; \quad (8c)$$

where D1, D2, and D3, are the recovered data for the n-th symbol for the I-, Q-, and the 3rd tributaries, respectively, which follow Table II.

TABLE II

| $\Delta\phi(n)$ | 0 | π/4 | π/2 | 3π/4 | π | 5π/4 | 3π/2 | 7π/4 |
|---|---|---|---|---|---|---|---|---|
| $\sqrt{2}\exp[-j\Delta\phi]=(n)]=(A+jB)\sqrt{2}$ | $\sqrt{2}$ | 1−j | −j$\sqrt{2}$ | −1−j | −$\sqrt{2}$ | −1+j | j$\sqrt{2}$ | 1+j |
| D1 = $c_I(n)$ | 1 | 1 | 0 | 0 | 0 | 0 | 1 | 1 |
| D2=$c_Q(n)$ | 1 | 1 | 1 | 1 | 0 | 0 | 0 | 0 |
| $x_1(n)$ = Re{x(n)} + Im{x(n)} | 3 | 3 | 1 | −1 | −3 | −3 | −1 | 1 |
| $x_2(n)$ = Im{x(n)} − Re{x(n)} | −1 | 1 | 3 | 3 | 1 | −1 | −3 | −3 |

TABLE II-continued

| Δφ(n) | 0 | π/4 | π/2 | 3π/4 | π | 5π/4 | 3π/2 | 7π/4 |
|---|---|---|---|---|---|---|---|---|
| D3 = $c_3(n)$ = xor($x_1 > 0, x_2 > 0$) | 1 | 0 | 0 | 1 | 1 | 0 | 0 | 1 |

The receiver 500 includes an MPSE block 510 which generates the three data tributaries, $c_I(n)$, $c_Q(n)$ and $c_3(n)$ from the decision variables $u_I(n)$ and $u_Q(n)$ generated directly by the optical detection circuit (501-505). The MPSE block 510 includes circuitry 513, 515, 523, 525 and 526 to generate the third data tributary in accordance with the expression above in Eq. 7c. The logic block 527 implements the functions described in Eqs. 8b and 8c, and outputs A and B, the real and imaginary parts of the term $\exp(-j\Delta\phi)$.

Figure 6:
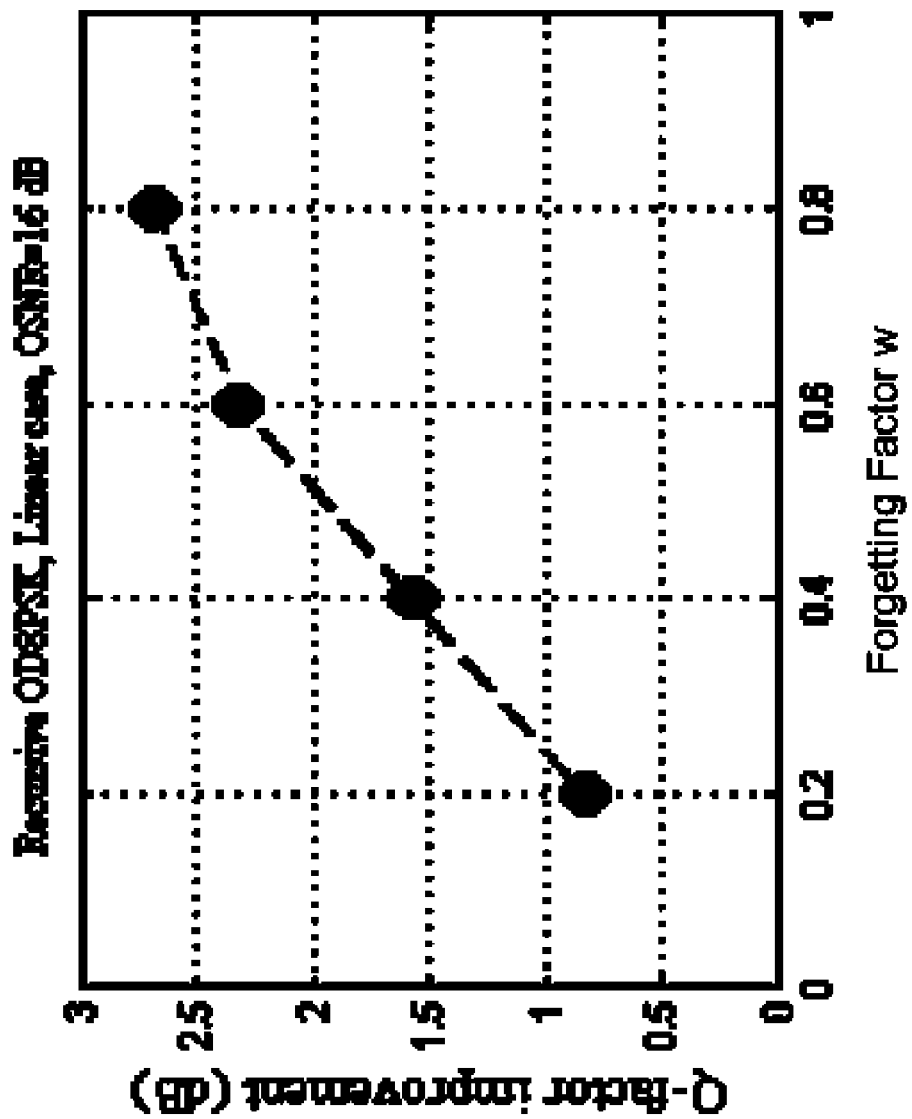
FIG. 6 is a graph showing the improvement in Q-factor attributable to the data-aided MSPE circuit of FIG. 5 as a function of the forgetting factor w, at a received OSNR of 16 dB.

Numerical simulation results confirm the substantial improvement in receiver sensitivity obtained by the use of data-aided MSPE in the OD8PSK receiver of the present invention. FIG. 6 shows the improvement in Q-factor over conventional detection obtained with data-aided MSPE detection for a 30-Gb/s OD8PSK signal as a function of the forgetting factor, w, at a received OSNR of 16 dB. The improvement increases as w increases.

Figure 7:
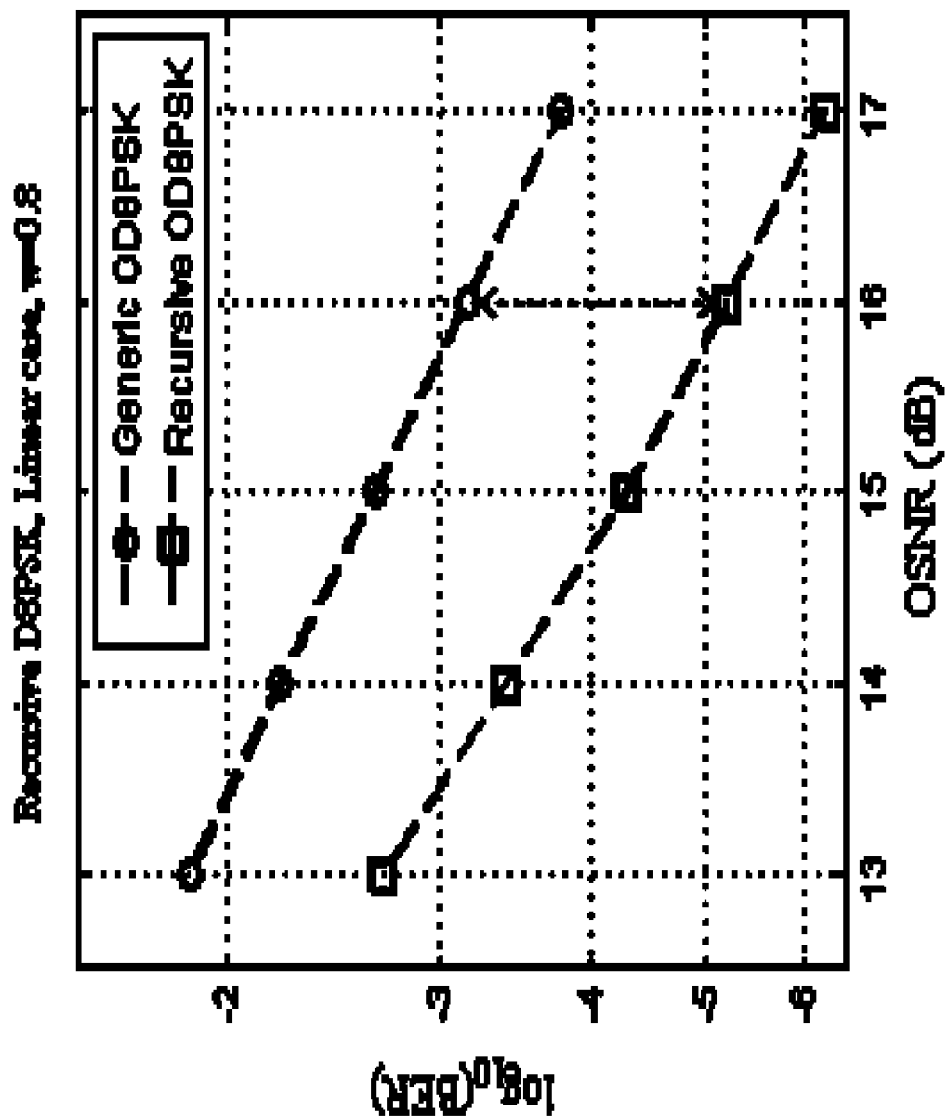
FIG. 7 is a graph showing the BER performance as a function of OSNR for a data-aided OD8PSK receiver of the present invention and for a conventional OD8PSK receiver.

FIG. 7 shows the BER performance as a function of OSNR for a data-aided OD8PSK receiver of the present invention and for a conventional receiver. The results shown in FIG. 7 are determined with a noise bandwidth of 0.1 nm and with a forgetting factor (w) of 0.8. As shown in FIG. 7, the data-aided OD8PSK receiver substantially outperforms the generic OD8PSK receiver with the BER being reduced by about two orders of magnitude ($10^{-3}$ to $10^{-5}$) at an OSNR of 16 dB.

Figure 8:
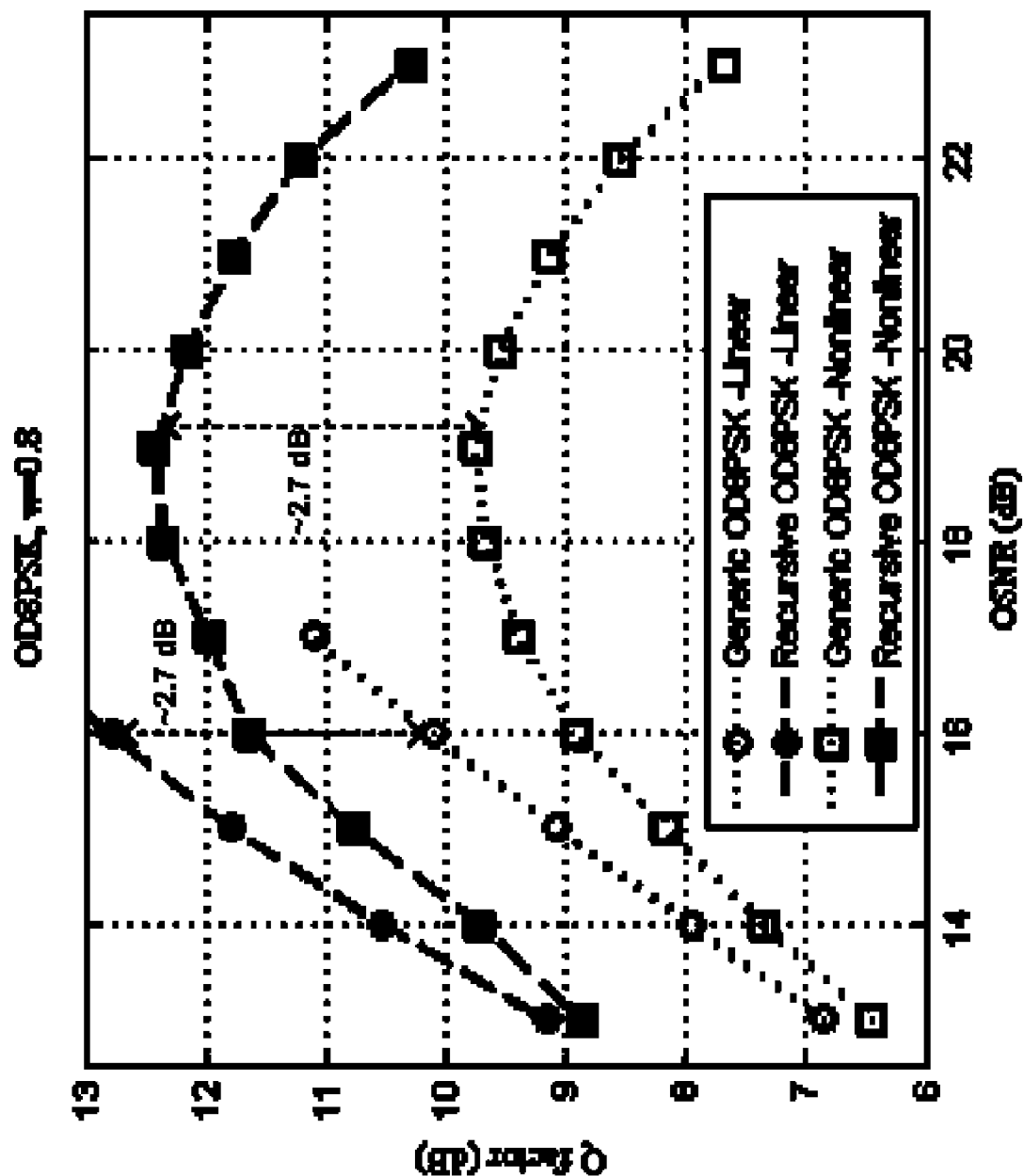
FIG. 8 is a graph showing the Q-factor as a function of OSNR, defined with a noise bandwidth of 0.1 nm, with a forgetting factor w of 0.8, for the OD8PSK receiver of FIG. 5 and for a conventional receiver.

FIG. 8 shows the Q-factor (derived directly from the BER) as a function of OSNR, with and without the consideration of fiber nonlinearity, for the data-aided OD8PSK receiver of the present invention and for a conventional OD8PSK receiver. A forgetting factor (w) of 0.8 is assumed. When fiber nonlinearity is considered, the nonlinear phase shift reaches 1 radian when the signal power is such that the OSNR is 19 dB. As shown in FIG. 8, the data-aided OD8PSK receiver substantially outperforms (by approximately 2.7 dB) the generic OD8PSK receiver in both the linear and nonlinear regimes.

Figure 9:
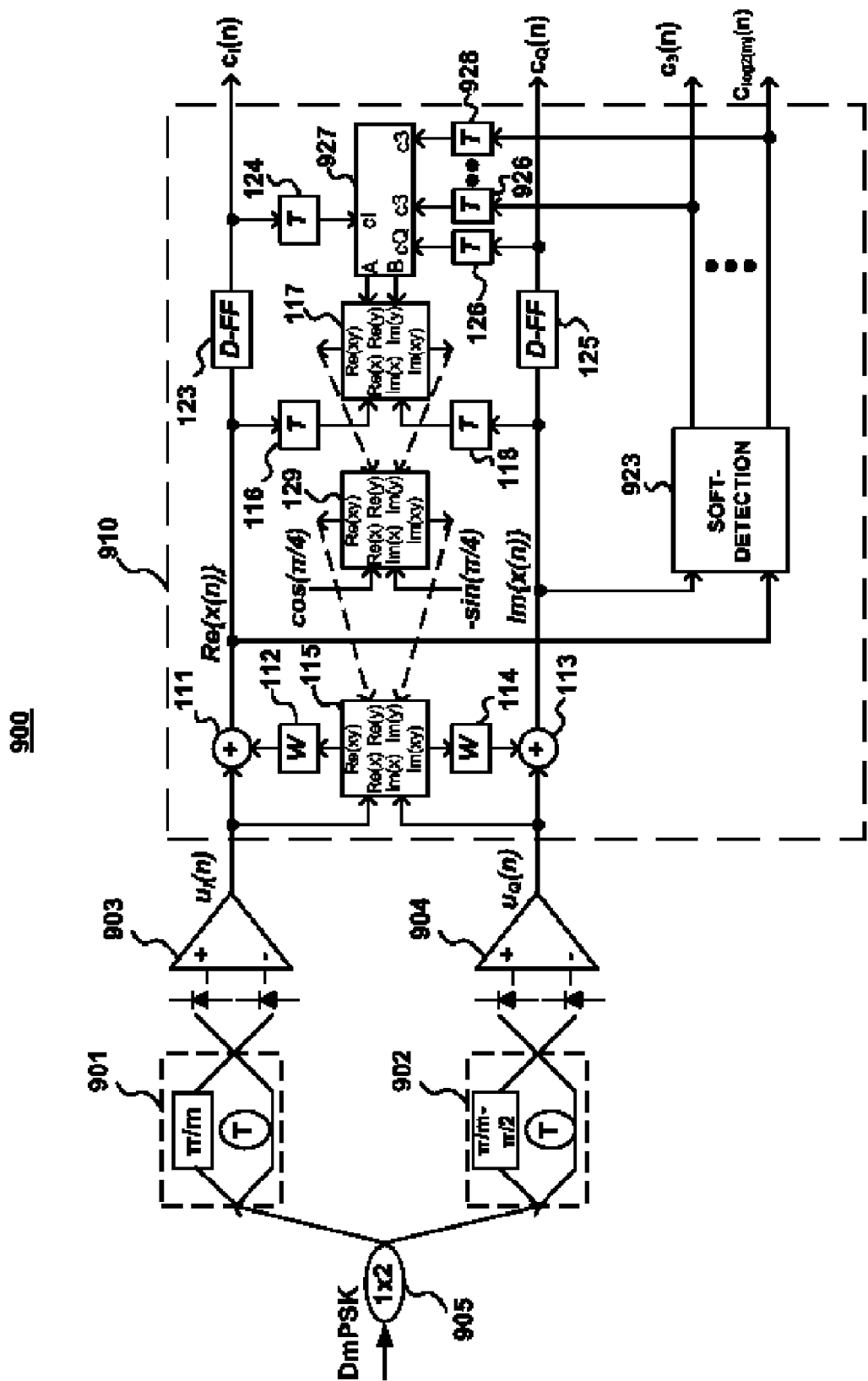
FIG. 9 is a schematic representation of an exemplary embodiment of an ODmPSK direct-detection MPSE receiver in accordance with the present invention.

The data-aided MSPE receiver of the present invention can also be extended to ODmPSK with more than eight phase levels (m>8), as shown in FIG. 9. As with the other embodiments described above, an advantageous feature of the receiver 900 of the present invention is that the optical components, 901-905, are essentially the same as those used in the conventional direct differential detection of ODQPSK, the primary difference being the phase offsets of the ODIs 901 and 902. The exemplary receiver 900 includes an MSPE block 910 which recovers the $\log_2(m)$ data tributaries from the outputs of the optical circuitry, as described below.

An improved complex decision variable for an ODmPSK signal can be expressed as follows:

$$x(n)=u(n)+wu(n)x(n-1)\exp(-j\Delta\phi(n-1))\exp(-j\pi/m), \quad (9)$$

where $\Delta\phi(n-1)=\phi(n-1)-\phi(n-2)\in\{[0:m-1]\pi/m\}$ represents the optical phase difference between the (n−1)-th symbol and the (n−2)-th symbol of the ODmPSK signal. $\exp(-j\Delta\phi(n))$ can be expressed in terms of the recovered data tributaries. A conversion or look-up table and DACs can be used to generate the real and imaginary parts of $\exp(-j\Delta\phi(n))$ for use in the MSPE circuit 910 of the receiver 900.

The MSPE block 910 includes a "soft" detection circuit 923 which determines the data tributaries $c_3(n)$ through $c_{log2(m)}(n)$ from the real and imaginary components of x(n) based on certain relations to be discussed in the following. To recover the log 2(m) data tributaries of an ODmPSK signal, it is desired to obtain m/2 decision variables. The m/2 decision variables would conventionally be demodulated by m/4 pairs of ODIs having phase offsets as set forth in Table III.

TABLE III

| ODI # | 1 | 2 | 3 | 4 | ... | m/2 − 1 | m/2 |
|---|---|---|---|---|---|---|---|
| Phase offset | π/m | π/m − π/2 | 3π/m | 3π/m − π/2 | | π(m/2 − 1)/m | −π/m |

The first ODI pair (ODI1, ODI2) is shown in FIG. 9 as ODI 901 and ODI 902. As shown below, the decision variable obtained by any one of the other ODI pairs can be effectively expressed by an appropriate combination of the two decision variables generated by ODI 901 and ODI 902, $u_I(n)$ and $u_q(n)$, where:

$$u_I = Re\{e^{j\pi/m} y_n y_{n-1}^*\},$$

$$u_Q = Re\{e^{j\pi(1/m-1/2)} y_n y_{n-1}^*\} = Re\{-j \cdot e^{j\pi/m} y_n y_{n-1}^*\} = Im\{e^{j\pi/m} y_n y_{n-1}^*\}, \quad (10)$$

The decision variable $dv(\pi p/m)$ obtained by the ODI with a phase offset of $\pi p/m$, where p=3, 5, ..., m/2−1, can be expressed as follows:

$$dv(\pi p/m) = Re\{e^{j\pi p/m} y_n y_{n-1}^*\} \quad (11)$$
$$= Re\{e^{j\pi(p-1)/m} \cdot e^{j\pi/m} y_n y_{n-1}^*\}$$
$$= \cos\left(\frac{p-1}{m}\pi\right)u_I - \sin\left(\frac{p-1}{m}\pi\right)u_Q.$$

The "complementary" decision variable $dv(\pi p/m - \pi/2)$ can be expressed as follows:

$$dv(\pi p/m - \pi/2) = Im\{e^{j\pi(p-1)/m} \cdot e^{j\pi/m} y_n y_{n-1}^*\} \quad (12)$$
$$= \sin\left(\frac{p-1}{m}\pi\right)u_I + \cos\left(\frac{p-1}{m}\pi\right)u_Q.$$

The m/2 improved decision variables can be obtained from Eqs. 10-12 with $u_I$ and $u_Q$ being replaced with $x_I$ and $x_Q$, respectively. The log 2(m) data tributaries can then be determined as follows:

$$c_I = (u_I > 0), \quad (13)$$
$$c_Q = (u_Q > 0),$$
$$c_3 = \left[dv\left(\frac{\pi}{m} + \frac{\pi}{4}\right) > 0\right] \oplus \left[dv\left(\frac{\pi}{m} - \frac{\pi}{4}\right) > 0\right],$$

-continued $$c_4 = \left[dv\left(\frac{\pi}{m} + \frac{\pi}{8}\right) > 0\right] \oplus \left[dv\left(\frac{\pi}{m} - \frac{3\pi}{8}\right) > 0\right] \oplus$$
$$\left[dv\left(\frac{\pi}{m} + \frac{\pi}{8}\right) > 0\right] \oplus \left[dv\left(\frac{\pi}{m} - \frac{3\pi}{8}\right) > 0\right],$$
...
$$c_{\log 2(m)} = \left[dv\left(\frac{\pi}{m} + \frac{2}{m}\pi\right) > 0\right] \oplus \left[dv\left(\frac{\pi}{m} + \frac{2+4}{m}\pi\right) > 0\right] \oplus$$
$$... \left[dv\left(\frac{\pi}{m} + \frac{m/2-2}{m}\pi\right) > 0\right] \oplus \left[dv\left(\frac{\pi}{m} + \frac{2}{m}\pi - \frac{\pi}{2}\right) > 0\right] \oplus$$
$$\left[dv\left(\frac{\pi}{m} + \frac{2+4}{m}\pi - \frac{\pi}{2}\right) > 0\right] \oplus$$
$$... \left[dv\left(\frac{\pi}{m} + \frac{m/2-2}{m}\pi - \frac{\pi}{2}\right) > 0\right],$$

where the number of decision variables used for the n-th data tributary is $2^{n-2}$ (for n>2), and the total number of decision variables used in Eq. 13 is:

$$1 + 1 + \sum_{n=3}^{\log_2(m)} 2^{n-2} = 1 + 1 + \sum_{i=1}^{\log_2(m)-2} 2^i \quad (14)$$
$$= 1 + \sum_{i=0}^{\log_2(m)-2} 2^i$$
$$= 1 + \frac{1 - 2^{\log_2(m)-1}}{1 - 2}$$
$$= 2^{\log_2(m)-1}$$
$$= \frac{m}{2}$$

Note that an appropriate pre-coding of the original data tributaries before optical modulation at the transmitter is needed to ensure that the decoded data tributaries are the original ones. The pre-coding function can be determined based on the optical modulation scheme and the optical de-modulation and de-coding schemes described in Eqs. 10-13.

Figure 10:
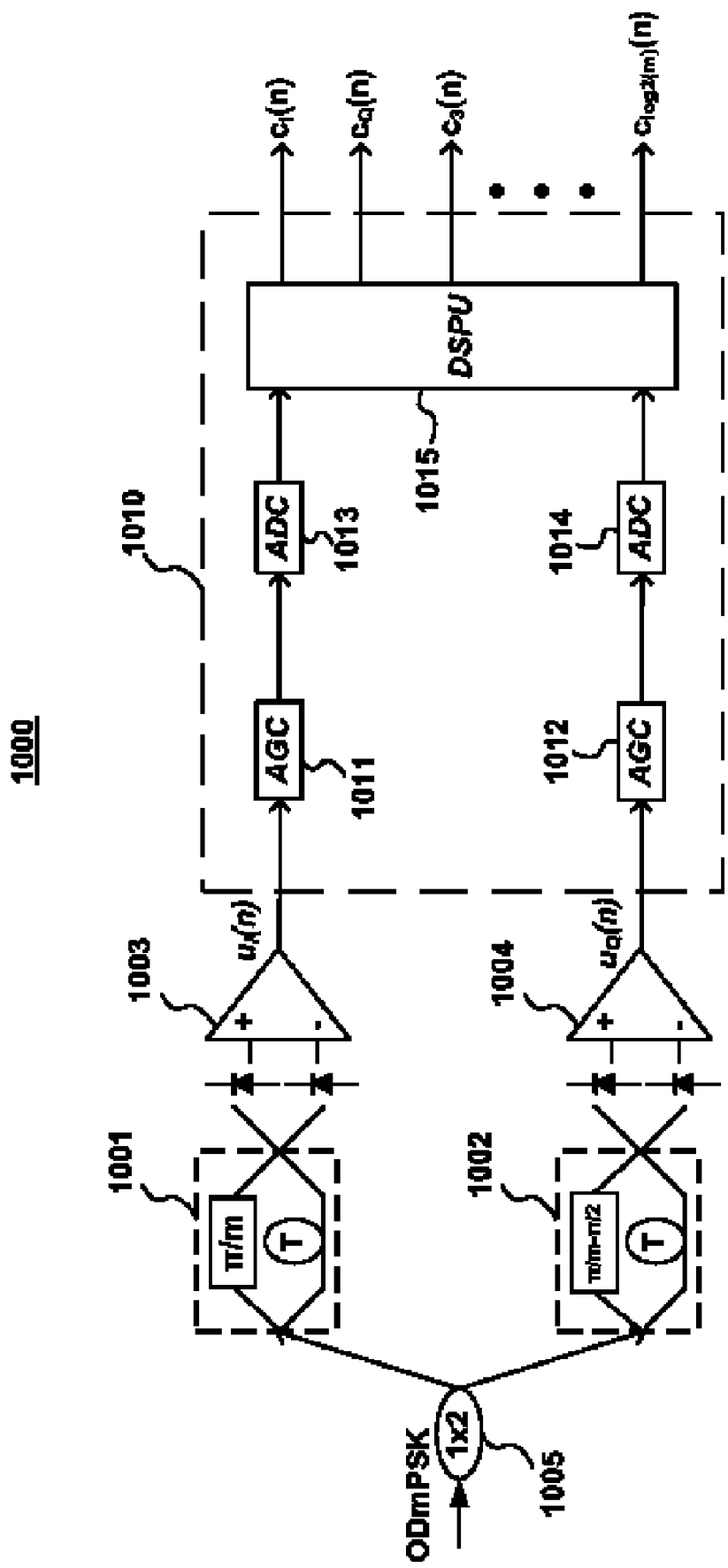
FIG. 10 is a schematic representation of an exemplary embodiment of an ODmPSK direct-detection MPSE receiver based on analog-to-digital converters (ADCs) and digital signal processors (DSPs) in accordance with the present invention.

The analog functions performed for the data-aided MSPE of an ODmPSK signal, such as the adding and multiplying functions, may also be performed in the digital domain with the help of analog-to-digital converters (ADCs) and digital signal processors (DSPs), as shown in FIG. 10. As with the other embodiments described above, an advantageous feature of the receiver 1000 of the present invention is that the optical components, 1001-1005, are essentially the same as those used in the conventional direct differential detection of ODQPSK. The exemplary receiver 1000 includes an MSPE block 1010 which recovers the log 2(m) data tributaries from the outputs of the optical circuitry, as described below. The two detected signals from balanced detectors 1003 and 1004 are first adjusted by automatic gain controllers (AGCs) 1011 and 1012 to have a fixed nominal power. Two ADCs 1013 and 1014 are used to digitize the detected analog signals. A digital signal processing unit (DSPU) 1015 then processes the two digitized signals, based on the MSPE algorithm described in Eq. 4, 5, 7d, or 9 to obtain the first two improved decision variables, from which the other data tributaries can also be derived per Eqs. 11 and 12. In the digital domain, a finite number of iterations (e.g., 4-20) can be used to recursively estimate the improved decision variables based on Eqs. 4, 5, 7d, and 9. Simulations show that about 10 iterations are sufficient to obtain most of the gain provided by the MSPE detection scheme. The DSPU 1015 can be implemented, for example, in an application specific integrated circuit (ASIC) or a field-programmable gate array (FPGA).

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method for determining a data content of an optical differential multi-level phase-shift keying (ODmPSK) signal, the method comprising:

demodulating the ODmPSK signal with optical delay interferometers (ODIs) to generate two quadrature optical components;

directly detecting the two quadrature optical components to generate an in-phase electrical signal, $u_I$, and a quadrature electrical signal, $u_Q$;

performing a data-aided multi-symbol phase estimation (MSPE) on the in-phase electrical signal and the quadrature electrical signal to generate at least two improved decision variables; and recovering a plurality of data tributaries representing the data content based on the improved decision variables.

2. The method of claim 1, wherein the ODmPSK signal is an optical differential quadrature phase-shift keying (ODQPSK) signal.

3. The method of claim 1, wherein the ODmPSK signal is an optical differential 8-level phase-shift keying signal (OD8PSK).

4. The method of claim 1, wherein the ODmPSK signal is modulated with amplitude-shift keying (ASK), thereby being an ODmPSK+ASK signal.

5. The method of claim 4, comprising:

detecting an intensity of the ODmPSK+ASK signal;

generating a normalizing signal that is inversely related to the signal intensity of a previous symbol; and using the normalizing signal in performing the data-aided MSPE.

6. The method of claim 5, wherein performing the data-aided MSPE includes performing a nonlinear phase shift compensation.

7. The method of claim 5, wherein the normalizing signal is obtained using recovered ASK data.

8. The method of claim 1, wherein an optical delay between the optical paths of each ODI is approximately one symbol period, I.

9. The method of claim 1, wherein an optical phase offset between the paths of the first ODI is π/m and an optical phase offset between the paths of the second ODI is π/m−π/2, where m is the number of phase levels of the ODmPSK signal.

10. The method of claim 1, wherein the data-aided MSPE uses the detected electrical signals and previously recovered data symbols to obtain two improved decision variables, $x_I$ and $x_Q$, in accordance with the following expressions:

$$x_I(n) = Re[x(n)], x_Q(n) = Im[x(n)], \text{ and}$$

$$x(n) \approx [u_I(n) + ju_Q(n)] + w \cdot [u_I(n) + ju_Q(n)] \cdot x(n-1) \cdot \exp(-j\Delta\phi(n-1)) \cdot \exp(-j\pi/m),$$

where w is a forgetting factor, Δφ(n−1) is an optical phase difference between the (n−1)th symbol and the (n−2)th symbol, and exp(−jΔφ(n−1)) is estimated by using previously recovered data symbols.

11. The method of claim 10, wherein the forgetting factor w is in a range of approximately 0.3 to 0.8.

12. The method of claim 1, wherein two of the at least two improved decision variables ($x_I$, $x_Q$) are used to generate the other decision variables (dv) in accordance with the following expressions:

$$dv(\pi p/m) = \cos\left(\frac{p-1}{m}\pi\right)x_I - \sin\left(\frac{p-1}{m}\pi\right)x_Q,$$

$$dv(\pi p/m - \pi/2) = \sin\left(\frac{p-1}{m}\pi\right)x_I + \cos\left(\frac{p-1}{m}\pi\right)x_Q,$$

where p=3, 5, ..., m/2−1.

13. An apparatus for determining a data content of an optical differential multi-level phase-shift keying (ODmPSK) signal, comprising:
   means for demodulating the ODmPSK signal to generate two quadrature optical components through optical delay interferometers (ODIs);
   means for directly detecting the two quadrature optical components to generate an in-phase electrical signal, $u_I$, and a quadrature electrical signal, $u_Q$;
   means for performing a data-aided multi-symbol phase estimation (MSPE) on the in-phase electrical signal and the quadrature electrical signal to generate at least two improved decision variables; and
   means for recovering a plurality of data tributaries representing the data content based on the improved decision variables.

14. The apparatus of claim 13, wherein the ODmPSK signal is an optical differential quadrature phase-shift keying (ODQPSK) signal.

15. The apparatus of claim 13, wherein the ODmPSK signal is an optical differential 8-level phase-shift keying signal (OD8PSK).

16. The apparatus of claim 13, wherein the ODmPSK signal is modulated with amplitude-shift keying (ASK), thereby being an ODmPSK+ASK signal.

17. The apparatus of claim 13, comprising:
   means for detecting an intensity of the ODmPSK+ASK signal; and
   means for generating a normalizing signal that is inversely related to the signal intensity of a previous symbol,
   wherein the means for performing a data-aided MSPE includes means for using the normalizing signal in the MSPE.

18. The apparatus of claim 17, wherein the means for performing a data-aided MSPE includes nonlinear phase shift compensation means.

19. The apparatus of claim 17, wherein the normalizing signal is obtained using recovered ASK data.

20. The apparatus of claim 13, wherein an optical delay between the optical paths of each ODI is approximately one symbol period, T.

21. The apparatus of claim 20, wherein an optical phase offset between the paths of the first ODI is π/m, and an optical phase offset between the paths of the second ODI is π/m−π/2, where m is the number of phase levels of the ODmPSK signal.

22. The apparatus of claim 13, wherein the means for directly detecting each quadrature optical component includes a balanced detector.

23. The apparatus of claim 13, wherein the means for performing a data-aided MSPE uses the detected electrical signals and previously recovered data symbols to obtain two improved decision variables, $x_I$ and $x_Q$, in accordance with the following expressions:

$x_I(n)=Re[x(n)], x_Q(n)=Im[x(n)],$ and $x(n) \approx [u_I(n)+ju_Q(n)]+w\cdot[u_I(n)+ju_Q(n)]\cdot x(n-1)\cdot\exp(-j\Delta\phi(n-1))\cdot\exp(-j\pi/m),$ where w is a forgetting factor, $\Delta\phi(n-1)$ is an optical phase difference between the (n−1)th symbol and the (n−2)th symbol, and $\exp(-j\Delta\phi(n-1))$ is estimated by using previously recovered data symbols.

24. The apparatus of claim 23 comprising logic means for obtaining the term $\exp(-j\Delta\phi(n-1))$ from previously recovered data symbols.

25. The apparatus of claim 23 comprising a digital-to-analog converter (DAC) for outputting the real and imaginary parts of the term $\exp(-j\Delta\phi)$.

26. The apparatus of claim 23, wherein the forgetting factor w is in a range of approximately 0.3 to 0.8.

27. The apparatus of claim 13 comprising means for using two of the at least two improved decision variables ($x_I$, $x_Q$) to generate the other decision variables (dv) in accordance with the following expressions:

$$dv(\pi p/m) = \cos\left(\frac{p-1}{m}\pi\right)x_I - \sin\left(\frac{p-1}{m}\pi\right)x_Q,$$

$$dv(\pi p/m - \pi/2) = \sin\left(\frac{p-1}{m}\pi\right)x_I + \cos\left(\frac{p-1}{m}\pi\right)x_Q,$$

where p=3, 5, ..., m/2−1.

28. The apparatus of claim 13, comprising:
   a first analog-to-digital converter (ADC) for digitizing in-phase electrical signal, $u_I$; and
   a second analog-to-digital converter (ADC) for digitizing the quadrature electrical signal, $u_Q$;
   wherein the means for performing a data-aided MSPE includes a digital signal processor (DSP) which processes the digitized in-phase and quadrature electrical signals.

29. The apparatus of claim 28, comprising:
   a first automatic gain control (AGC) means for performing AGC on the in-phase electrical signal before it is digitized by the first ADC; and
   a second automatic gain control (AGC) means for performing AGC on the quadrature electrical signal before it is digitized by the second ADC.

30. The apparatus of claim 28, wherein the means for performing a data-aided MSPE includes an application specific integrated circuit (ASIC).

31. The apparatus of claim 28, wherein the means for performing a data-aided MSPE includes a field-programmable gate array (FPGA).

32. The apparatus of claim 28, wherein the means for performing a data-aided MSPE uses a finite number of iterations in a range of approximately 4 to 20.

* * * * *

UNITED STATES PATENT AND TRADEMARK OFFICE
CERTIFICATE OF CORRECTION

PATENT NO. : 7,623,796 B2  Page 1 of 1
APPLICATION NO. : 11/307899
DATED : November 24, 2009
INVENTOR(S) : Xiang Liu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 876 days.

Signed and Sealed this

Fourteenth Day of December, 2010

David J. Kappos
*Director of the United States Patent and Trademark Office*